Aug. 16, 1938.  B. G. HARLEY  2,127,359
COUPLING
Filed Nov. 24, 1936  2 Sheets-Sheet 1

INVENTOR
BERTRON G. HARLEY,
BY Arthur Middleton
ATTORNEY.

Aug. 16, 1938. B. G. HARLEY 2,127,359
COUPLING
Filed Nov. 24, 1936 2 Sheets-Sheet 2
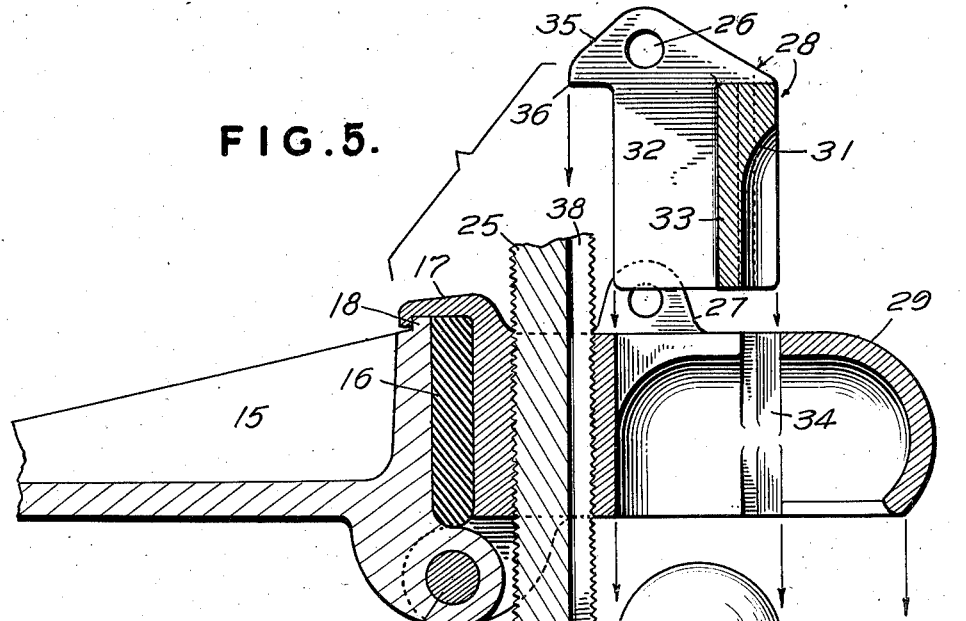
FIG.5.
FIG.4.
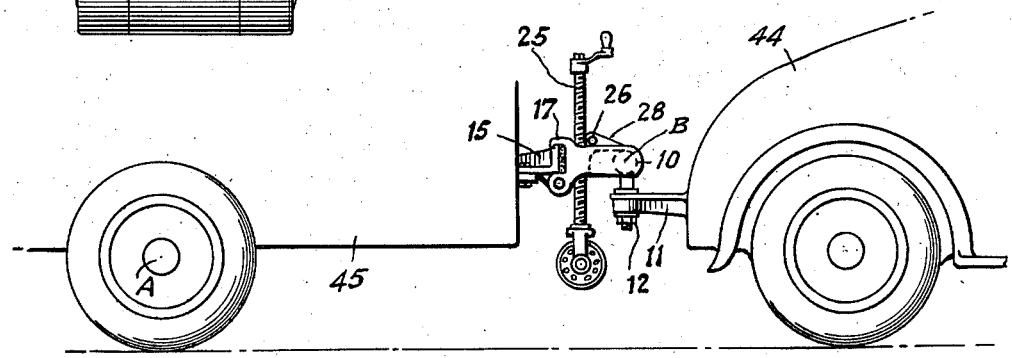
FIG.6.
INVENTOR
BERTRON G. HARLEY,
BY
ATTORNEY.

Patented Aug. 16, 1938

2,127,359

UNITED STATES PATENT OFFICE 2,127,359

COUPLING

Bertron G. Harley, Saco, Maine

Application November 24, 1936, Serial No. 112,502

4 Claims. (Cl. 280—33.15)

This invention relates to trailer couplings, and more in particular it relates to position or connection securing means and to locking means therein, by the manipulation of which the trailer is connected or disconnected with respect to its tow car.

Among the objects are to produce a coupling which is simple, comprising a minimum of parts, which is rugged, compact, and inexpensive, and is yet easy and expeditious to manipulate.

To attain these objects the invention contemplates avoiding as far as possible levers, springs, pivots or other movable operating or manipulating elements, such as found to be used in varying numbers and combinations in coupling constructions of this kind, and to reduce the connection-securing means in the coupling substantially to a single rugged element, namely, a plug or key member adapted to block the back lash which potentially exists in a certain lost motion connection in a preferred conventional and otherwise known ball-and-socket joint which detachably connects the trailer with the tow car.

A spherical or ball portion constitutes one main element of the coupling for instance on the tow car side thereof and is associable in bayonet fashion with a surrounding corresponding main coupling element having the form of an elongated hollow or socket portion on the trailer side of the coupling. The bayonet connection as such leaves these main coupling elements susceptible to back lash or lost motion unless checked and held in their cooperative association by suitable connection securing or blocking or locking means. Such means according to this invention consist broadly in a self-locking unitary key member or key like element adapted to be moved into a transverse passage of the socket portion of the coupling. In other words, the key member while removable from and insertable into the socket portion is movable substantially transversely into and positionable in the path of the potential back lash movement of the ball portion relative to its elongated socket portion. In other words, the key-member is freely positionable along vertical guide faces formed by the walls of the socket portion. When in locking position the key member confines the ball in socket engaging position, a suitable lock device being applicable or arrangeable as between the key member and the socket portion to prevent removal of the key member, and to provide safety against theft and otherwise.

Some features of the invention reside in the simple structural arrangement of the key or latch member, and more specifically in a certain peculiar substantially fork- or Y- or T-shaped cross-sectional profile thereof and an opening in the socket portion through which it may be dropped into place; other features lie in a simple safety lock arrangement for such a key.

Still other features have to do with a simple although dual blocking effect attained by a peculiar relation of the key member with the ball and socket joint on the one hand and with the parking wheel mechanism on the other hand, this dual function in effect being attained by the identical manipulation of a single element such as the key member.

According to one preferred embodiment the parking wheel of the trailer can be raised or lowered by rotation of a vertical screw spindle which is operatively mounted in the socket portion on the trailer side of the coupling and compactly enough disposed relative to the coupling to come within and under the influence of the key or latch member. That is to say, a protruding portion or lug of the key by way of certain engagement with the spindle becomes effective to lock the spindle to the one or the other of its respective vertical positions. In this way the position of the parking leg may be locked per se or along with the coupling as may be desired.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated embodiments of the invention known to me, but such embodiments are to be regarded as typical only of many possible embodiments and the invention is not to be limited thereto.

The novel features considered characteristic of my invention are set forth with particularity in the appended claims. The invention itself, however, both as to its organization and its method of operation, together with additional objects and advantages thereof, will best be understood from the following description when read in connection with the accompanying drawings in which:

Fig. 4 is a cross section along the line 4—4 of Fig. 3.

Fig. 5 is a longitudinal sectional elevational view of the coupling showing the coupling withdrawn.

Fig. 6 is a diagrammatic showing of the coupling arrangement as between a tow car and a trailer.

Figure 2:
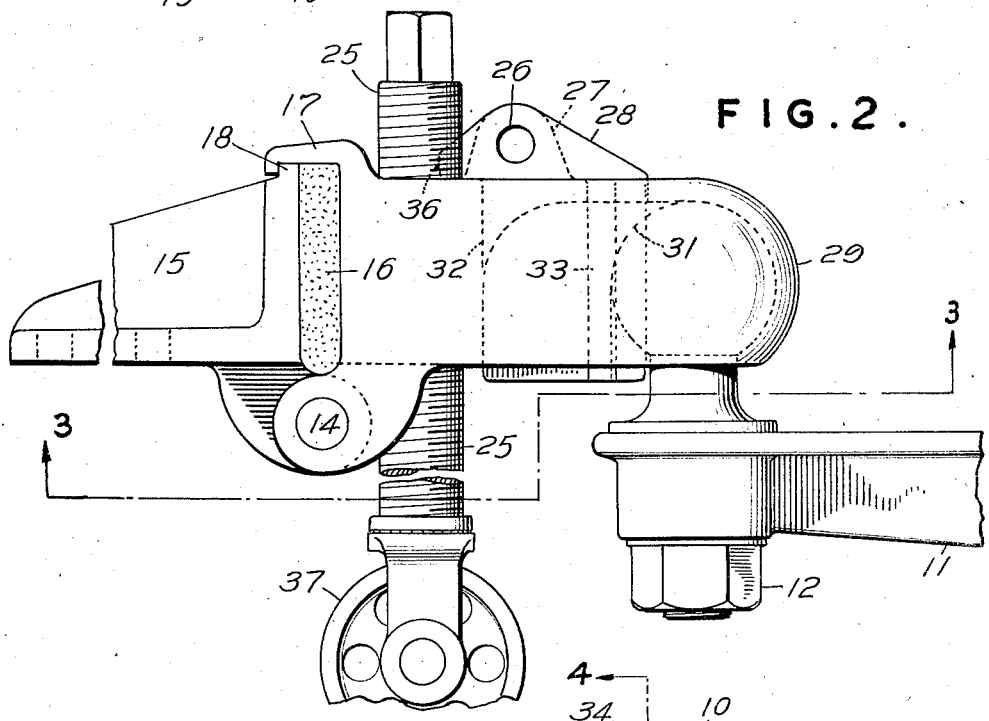
Fig. 2 is a side view thereof.
Figure 3:
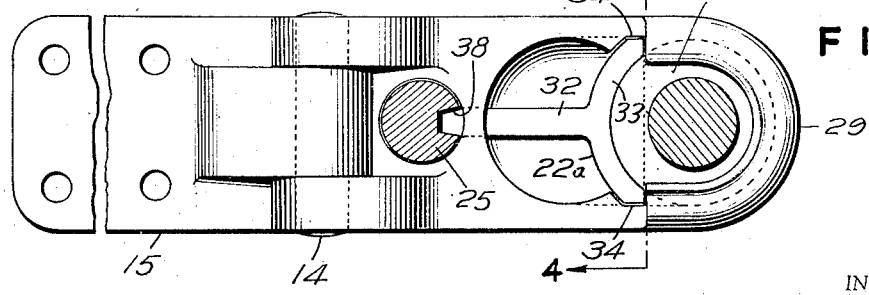
Fig. 3 is a part sectional view from the bottom of the coupling assembly of Figure 2, according to the section line 3—2 thereof.

In Fig. 2 a key member 28 constitutes in effect a plug self locking gravity-seated key-like element that can be inserted from the top through a suitable T-shaped opening into a socket member 29 of the coupling so that it will occupy the lost motion space between the socket member and a spherical coupling element 30. It will thus be seen that the blocking member or key 28 is of substantially T-shaped cross-section, although it has a caved portion 31 that offers some complementary bearing surface for the spherical coupling element 30. The T-shape of the blocking member or key 28 includes a web portion 32 and a transverse portion 33, which latter is formed with an outer concavely curved face by which it is adapted to engage upon or to be engaged by a corresponding portion of the spherical coupling element 30. The lateral edges of the transverse portion 33 are adapted to slide into and out of corresponding vertical grooved or guide portions 34 provided at the interior of the socket member 29. The positioning of the latch 28 by way of these grooves is most clearly illustrated in the bottom view of Fig. 5.

Figure 1:
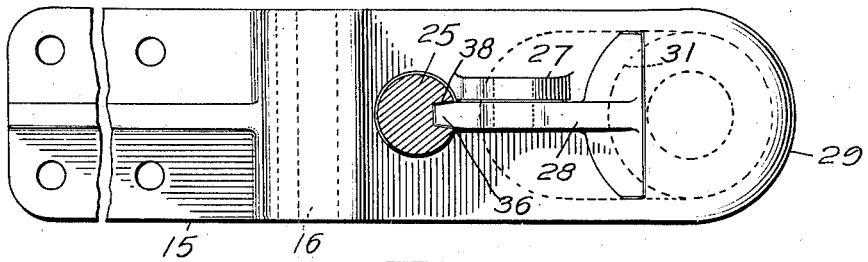
Fig. 1 is a top view of the coupling assembly.

The latch 28 furthermore has an outwardly extending rib portion or lug 35 substantially in line with the web portion 32, which rib portion 35 furthermore has a horizontally protruding portion or tooth 36 provided for a purpose of locking the parking leg spindle 25 in a manner now to be described in connection with the showing of Fig. 1.

According to Fig. 2, a screw spindle 25 serving as a parking leg for an axle trailer and carrying at its lower end a parking wheel 37, is shown to be threaded into a portion of the socket member 29, and at a place between the resilient hinge or pivot connection 14 and the key element 28, and disposed close enough to the latter to interengage and interlock with the extreme free end portion or extremity or tooth 33 thereof by way of engaging in the longitudinal groove 38 provided to extend substantially along the length of the spindle. That is to say the spindle can be screwed up and down between operative and out of function position, and in any of these positions it can be locked by placing the blocking member 27 into locking position when the tooth 36 will engage in the groove 38 of the spindle and prevent further rotation thereof. Since any suitable safety lock device may be employed to prevent removal of the key or blocking member 27, this will also prevent unlawful operation of the spindle. Since in the present embodiment the tooth 36 of the blocking member has a hole 26 adapted to register with a similar hole of the adjacent eye 27 rising from the top of the socket member 29, a safety lock device can be easily provided by slipping a padlock or the like through these holes.

Operation: Assuming a trailer 45 (see Fig. 6) as being hitched to a tow car 44 it will be seen that the coupling is conditioned as shown in Fig. 2, that is to say, the key element 28 is in its operative position when its face 31 has bearing engagement with and confines the ball element 30, while the extremity 36 of the key element lodges in the groove 38 of spindle 25, thus locking the same in a raised position with the parking wheel 37 off the ground. That is to say at this time, when the key element 28 is in operative position, the ball element 30 is held in the socket member for free rotational movement. The key element on the one hand and the concave portion of the socket member on the other hand are then effective to maintain coupling relationship of the ball and the socket member, the relationship of the parts being such that pressure from the ball acts substantially normal to a pressure receiving surface of the key element 28, directly adjacent to the ball, and through and transversely of the key member 28 in a direction substantially normal to the vertical guide faces along which the key member is positioned with respect to the socket member 29. A safety means, such as a padlock (not shown) traversing the latch 28 and the eye 27 by way of the registering holes therein, may secure the key in position and against tampering and against unlawful disconnection of the trailer from the tow car.

From Figs. 2 and 5 it appears that the key or key-like element 28 represents a single vertically slidable self-locking element that is gravity seated in the socket member 29 and gravity retained in self-locking relation to the ball element 30 when so seated. Incidental to such self-locking relationship it will be observed that the key 28 assumes a vertical line of contact with the socket member by way of the rear vertical edge of the web portion 32 of the key being urged against a corresponding vertical face inside the socket member 30 through pressure liable to be exerted from the ball element 30, while on the other hand at least two points of contact are established between the key 28 and the ball element 30.

As a practical feature in the process of coupling ball element 30 with the socket member 29, the ball element is positioned underneath the socket member while the key is in gravity seated position. As the ball is then caused to enter the hollow of the socket member it will, at the same time, displace the key 28 upwardly until the ball finds its proper operative seat in the socket, whereupon the key 28 will simply automatically drop into gravity seated and self-locking position. This basically secures ball and socket in operative relationship.

To understand the functioning of the shock-absorbing or cushioning device described in association with and as incorporated in this trailer coupling, that is to say, in the instance of Fig. 2, the functioning of the hinge or pivot connection 14 and of the cushion 16, it should be noted from the showing in Fig. 6 that a resilient system exists between the points A and B, which points constitute the trailer wheel axle and the spherical coupling element 10. Between these points a third point C, which is the hinging point or pivot connection 14, is free to sag a limited distance due to the compression of the cushion 16 as caused for instance by the momentum of the trailer urging forward in a sudden slow down of the running tow car. However, the cushioning device also is liable to absorb transverse shocks from the trailer.

To detach and park the trailer, the procedure is first to unlock the key 28 as by removing the padlock or other safety locking device mentioned above, then undoing the key by lifting it into the Fig. 5 position. This frees the parking leg or spindle 25 from its locking engagement with the key 29 so that the spindle may be screwed down until the parking wheel reaches the ground to sustain the trailer and at the same time far enough to jack it up into a position high enough to permit the socket member 29 to disconnect from the spherical coupling element 10 of the tow car. Hereafter the key element 28 may be dropped back or allowed to drop back into place, care being taken that the extremity 24 thereof gets re-engaged in the groove 38 of the spindle 25, thus locking and securing the latter in its parking position and constituting a safety means for preventing the unlawful manipulation or theft of the trailer, per se.

I claim:

1. Coupling apparatus for loosely connecting a vehicle with a structure adapted to be moved by said vehicle comprising a member having a ball, a second member having a socket larger than the ball into which the ball is adapted to extend loosely, said socket having a concave portion adapted to receive the ball; a single key-like element freely positionable along vertical guide faces formed by the walls of said second member, said key-like member being so constructed and arranged that when in operative position said ball is held in said socket for free rotational movement, said key-like element and said concave portion being effective to maintain coupling relationship of said first with said second-mentioned coupling member, the relationship of the parts being such that pressure from the ball acts substantially normal to a pressure receiving key surface directly adjacent to the ball and through and transversely of said key member in a direction substantially normal to said vertical guide faces.

2. Apparatus according to claim 1 in which there is at least one vertical line of contact between the key-like member and the socket member which vertical line substantially falls into a vertical plane defined by it and the center of the ball, and in which the ball has at least two points of contact with said key-like member which two points are symmetrical to said vertical line of contact and are located in a horizontal plane defined by them and the center of the ball.

3. Apparatus according to claim 1 in which the key-like element is substantially fork-shaped in cross section.

4. Apparatus according to claim 1, in which the key-like element is substantially Y-shaped in cross section.

BERTRON G. HARLEY.